United States Patent
Osanai

(10) Patent No.: US 7,764,194 B2
(45) Date of Patent: Jul. 27, 2010

(54) VEHICLE-USE COMMUNICATION APPARATUS FOR RECEIVING INFORMATION TRANSMITTED BY MODULATED LIGHT FROM SIGNAL LAMP OF TRAFFIC SIGNAL APPARATUS

(75) Inventor: Satoshi Osanai, Kariya (JP)

(73) Assignee: Denso Corporation, Kariya (JP)

( * ) Notice: Subject to any disclaimer, the term of this patent is extended or adjusted under 35 U.S.C. 154(b) by 403 days.

(21) Appl. No.: 12/012,764

(22) Filed: Feb. 5, 2008

(65) Prior Publication Data
US 2008/0187318 A1    Aug. 7, 2008

(30) Foreign Application Priority Data
Feb. 6, 2007 (JP) ............................. 2007-027185

(51) Int. Cl.
*G08G 1/095* (2006.01)
*G08G 1/00* (2006.01)
*G08B 13/18* (2006.01)

(52) U.S. Cl. .................... 340/907; 340/903; 340/904; 340/905; 701/117

(58) Field of Classification Search .................. 340/907
See application file for complete search history.

(56) References Cited

U.S. PATENT DOCUMENTS

| 5,204,536 | A | 4/1993 | Vardi |
| 6,765,495 | B1 | 7/2004 | Dunning et al. |
| 2003/0117088 | A1 | 6/2003 | Tanabe et al. |
| 2006/0119489 | A1 | 6/2006 | Shinada et al. |

FOREIGN PATENT DOCUMENTS

| DE | 10 2005 012 984 | 10/2006 |
| JP | 2002-175522 | 6/2002 |
| JP | 2004-013401 | 1/2004 |
| JP | 2004-040506 | 2/2004 |
| JP | 2004-051014 | 2/2004 |
| JP | 2005-164482 | 6/2005 |
| JP | 2005-184212 | 7/2005 |
| JP | 2006-323766 | 11/2006 |

OTHER PUBLICATIONS

Office action dated Feb. 25, 2009 in German Application No. 10 2008 007 494.2.

*Primary Examiner*—Donnie L Crosland
(74) *Attorney, Agent, or Firm*—Harness, Dickey & Pierce, PLC

(57) ABSTRACT

A communication apparatus of a first vehicle receives information conveyed by modulated light emitted by a signal lamp of a traffic light apparatus or by the tail lamp of a preceding vehicle, and can relay the information to a second (following) vehicle, by modulated light emitted from a tail lamp of the first vehicle. If the first vehicle is concurrently receiving modulated light from both a signal lamp of a traffic light apparatus and a tail lamp of a preceding vehicle, only the information transmitted from the signal lamp is relayed to the second vehicle.

6 Claims, 6 Drawing Sheets

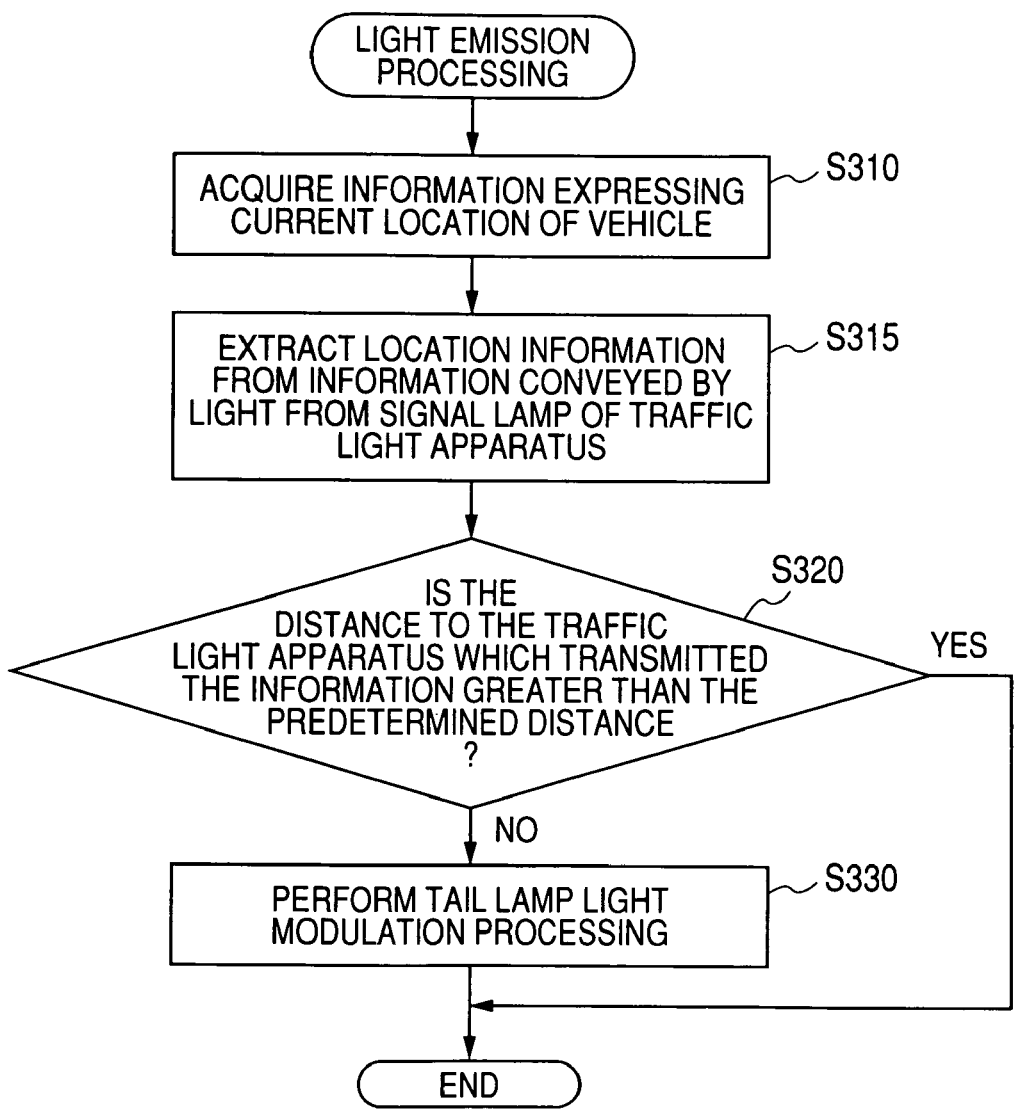

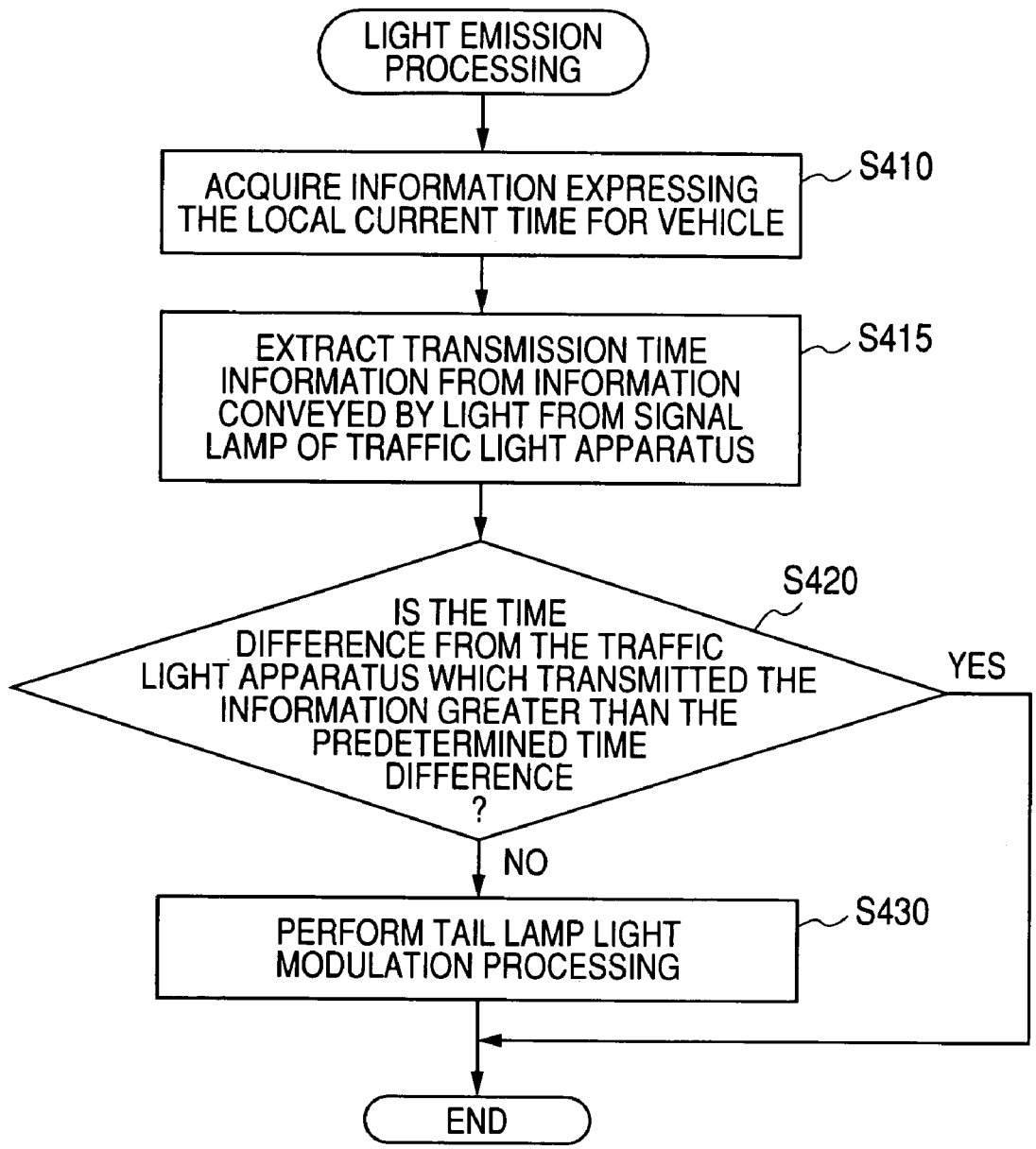

VEHICLE-USE COMMUNICATION APPARATUS FOR RECEIVING INFORMATION TRANSMITTED BY MODULATED LIGHT FROM SIGNAL LAMP OF TRAFFIC SIGNAL APPARATUS

CROSS-REFERENCE TO RELATED APPLICATIONS

This application is based on and incorporates herein by reference Japanese Patent Application No. 2007-027185 filed on Feb. 6, 2007.

BACKGROUND OF THE INVENTION

1. Field of Application

The present invention relates to a vehicle-use communication apparatus to be employed in an intra-traffic communication system in which light emitted by a signal lamp of a traffic light apparatus is modulated to convey information that is transmitted to a vehicle, and whereby that vehicle can relay the information to a following vehicle.

2. Description of Related Art

As described for example in Japanese Patent first Publication No. 2004-13401, referred to in the following as reference document 1, a type of intra-traffic communication system is known in which a vehicle can receive information that is transmitted from a traffic light apparatus or from another vehicle, with the information conveyed as a signal that modulates the light emitted by a signal lamp of the traffic light apparatus or the light emitted by a tail lamp or headlight of the other vehicle. The receiving vehicle is equipped with a vehicle-use communication apparatus whereby the received information is demodulated and displayed on a display panel.

However with the apparatus of reference document 1, the signals used for communication between a traffic light apparatus and a vehicle are independent of the signals used for communication between vehicles. No specific method has been described whereby a vehicle that receives information transmitted as a light-modulated signal from a traffic light apparatus can transmit (relay) that signal to a following vehicle.

The information transmitted in that manner by a traffic light apparatus can for example express the indication condition of the signal lamps of that traffic light apparatus, or the time that will elapse until a changeover of the indication condition. However that information will be valid only for a vehicle that has almost reached the location of the traffic light apparatus. Alternatively stated, if the information is received by a vehicle that is approaching a preceding traffic light apparatus (i.e., which is at a location preceding that of the traffic light apparatus that is transmitting the information) then this can result in confusion to the driver of the latter vehicle.

Furthermore, in the case in which information relating to traffic accidents or traffic conditions or information relating to traffic restrictions is transmitted from a traffic light apparatus, the information may not necessarily be valid for vehicles which are located substantially distant from that traffic light apparatus.

SUMMARY OF THE INVENTION

It is an objective of the present invention to overcome the above problems by providing a vehicle-use communication apparatus whereby information can be transmitted from a traffic light apparatus to a vehicle and whereby when that vehicle transmits the information to a following vehicle, each of the vehicles can receive appropriate information.

To achieve the above objective, the invention provides a vehicle-use communication apparatus installed in a vehicle that operates within a traffic communication system in which a signal lamp of a traffic light apparatus emits light which is modulated with a signal conveying specific information, and in which a preceding vehicle (if equipped with such an apparatus) similarly transmits information by modulated light, emitted from a tail lamp. The vehicle-use communication apparatus is configured to respond to received modulated light by transmitting the corresponding information (i.e., by modulation of light emitted by a tail lamp) to a following vehicle. Such a vehicle-use communication apparatus includes a photo-receptive device which receives modulated light emitted from a signal lamp of a traffic light apparatus and/or modulated light which is emitted from a tail lamp of a preceding vehicle. An output signal thereby obtained by the photo-receptive device is demodulated, to recover the corresponding signal, and thereby obtain the conveyed information. That information is then notified (i.e., by a visible display or by an audio indication device) to the vehicle driver, and is also applies as an electrical signal that modulates the light emitted from a tail lamp of the vehicle, to be thereby transmitted to a following vehicle.

From a first aspect, the present invention is characterized in that such a vehicle-use communication apparatus comprises:

(a) discrimination circuitry which distinguishes between reception of modulated light emitted from signal lamp of a traffic light apparatus and modulated light that is emitted from a tail lamp of a preceding vehicle; and, (b) control circuitry which controls the notification means and the light emission control circuitry in accordance with results obtained by the discrimination circuitry. This control is applied such that when modulated light is received by the photo-receptive device concurrently from a signal lamp of a traffic light apparatus and from a tail lamp of a preceding vehicle, only the information conveyed by the light from the signal lamp is notified to the vehicle driver and is transmitted to a following vehicle.

The above aspect of the invention is advantageous for example in a condition in which a first vehicle has approached a traffic light apparatus and is receiving modulated light that is emitted from a tail lamp of a second (i.e., preceding) vehicle in addition to receiving modulated light emitted from a signal lamp of the traffic light apparatus. In such a case, it is probable that the second vehicle has already passed that traffic light apparatus. Thus, the second vehicle may be transmitting information that is not valid for the first vehicle, which may result in confusion.

For that reason, with the present invention, the vehicle-use communication apparatus is configured to be capable of respectively recognizing a light source constituted by a tail lamp of a vehicle and a light source constituted by a signal lamp of a traffic light apparatus. In a condition in which modulated light is being received from both a tail lamp of a preceding vehicle and a signal lamp of a traffic light apparatus, only the information that is conveyed by the light emitted from the traffic light apparatus is extracted and notified to the vehicle driver, and transmitted to a following vehicle.

In that way it can be reliably ensured that when a vehicle has approached a traffic light apparatus and is transmitting information that is propagated to successive following vehicles, the information thus propagated will be valid for each of these vehicles.

The photo-receptive device of such a vehicle-use communication apparatus may comprise a camera apparatus which derives image data expressing a captured image of a region exterior to the vehicle, i.e., a region defined by the field of view of the camera apparatus. In that case, the camera apparatus is installed on the vehicle such that a signal lamp of the traffic light apparatus and a tail lamp of a preceding vehicle can each come within the field of view. The discrimination circuitry is configured to analyze the image data, for thereby judging whether a light source appearing in the captured image is a signal lamp of a traffic light apparatus or a tail lamp of a preceding vehicle.

With that aspect of the invention, since an image of the scene ahead of the vehicle (more specifically, a series of successive images) is captured and obtained as image data, the discrimination circuitry can apply such methods as template matching for analyzing the image data, to perform a judgement for each of (one or more) light sources appearing in the captured image(s) as to whether the light source is a signal lamp or is a tail lamp of a vehicle.

If a signal lamp of a traffic light apparatus is thereby recognized in the captured image, then an image signal component corresponding to the modulated light from the signal lamp is extracted from the image data, and is demodulated to thereby recover the signal that is transmitted from the traffic light apparatus.

As an alternative to such a method of utilizing image data, the vehicle-use communication apparatus may be configured to operate within a traffic communication system in which the modulated light emitted by a signal lamp of a traffic light apparatus vehicle conveys (as additional information) a transmission source code. The modulated light emitted by a tail lamp of a vehicle similarly conveys such a transmission source code. The transmission source code serves to specify whether the source of the emitted light is a traffic light apparatus or is a vehicle tail lamp.

In that case, the discrimination circuitry of the vehicle-use communication apparatus is configured to judge whether received modulated light is emitted from a signal lamp of a traffic light apparatus or from a tail lamp of a preceding vehicle, based on the transmission source code that is conveyed by the received modulated light.

With such a system, it becomes unnecessary for each vehicle-use communication apparatus to incorporate a camera apparatus, and instead a device such as a photodiode can be utilized to receive modulated light emitted from a traffic light apparatus or vehicle tail lamp. The transmission source code and other information can thereby be obtained by demodulation of an electrical signal produced by the photodiode.

From another aspect, a vehicle-use communication apparatus according to the present invention can be configured to operate within a traffic communication system in which each traffic light apparatus modulates light emitted by a signal lamp in accordance with a signal that expresses a signaling condition of the traffic light apparatus. Here, the signaling condition can for example be an amount of time remaining before the statuses of the signal lamps of the traffic light apparatus will change (e.g., from red-emitting to green-emitting).

Such information is only valid for a vehicle which has reached or is approaching that specific traffic light apparatus. If there is a large distance between adjacent traffic light apparatuses, then it is possible that such signaling condition information transmitted from a traffic light apparatus may be received by a vehicle which is substantially distant from that traffic light apparatus. However with the present invention it becomes possible to ensure that information is propagated from a traffic light apparatus throughout only a specific range of distance, i.e., a range within which the information will be valid.

To achieve this, the invention provides a vehicle-use communication apparatus for operation within a traffic communication system in which each of respective traffic light apparatuses transmits information (by modulated light emitted by a signal lamp as described above) which includes position information indicating the location of that traffic light apparatus. The vehicle-use communication apparatus includes a position detection apparatus (e.g., a vehicle navigation apparatus) which derives position information indicating the current location of the vehicle. In addition the vehicle-use communication apparatus includes circuitry for calculating the distance between the traffic light apparatus and the vehicle, based on the position information from the traffic light apparatus and the position information from the position detection apparatus of the vehicle, and to judge whether the distance exceeds a predetermined value. If the distance is exceeded, then information received from the traffic light apparatus is inhibited from being transmitted to a following vehicle. In that way, propagation of non-valid data can be prevented.

Alternatively, the vehicle-use communication apparatus can be configured for operation within a traffic communication system in which when a traffic light apparatus transmits a signal by modulated light, the signal conveys information specifying the time point at which the signal is transmitted. In that case, each vehicle-use communication apparatus includes an apparatus capable of precisely determining the current time, such as a GPS (global positioning satellite) apparatus, and is configured to calculate the difference between the transmission time point of a signal received from a traffic light apparatus and the current time point. The time difference can then be compared with a predetermined value, and so used in the same manner as the distance between the traffic light apparatus and the vehicle, described above.

BRIEF DESCRIPTION OF THE DRAWINGS

FIG. 5 is a flow diagram of communication control processing executed by a second alternative embodiment, utilizing the distance between a receiving vehicle and a transmitting traffic light apparatus; and, FIG. 6 is a flow diagram of communication control processing executed by a third alternative embodiment, utilizing the difference between transmission time and reception time of a signal transmitted from a traffic light apparatus.

DESCRIPTION OF PREFERRED EMBODIMENTS

Figure 1:
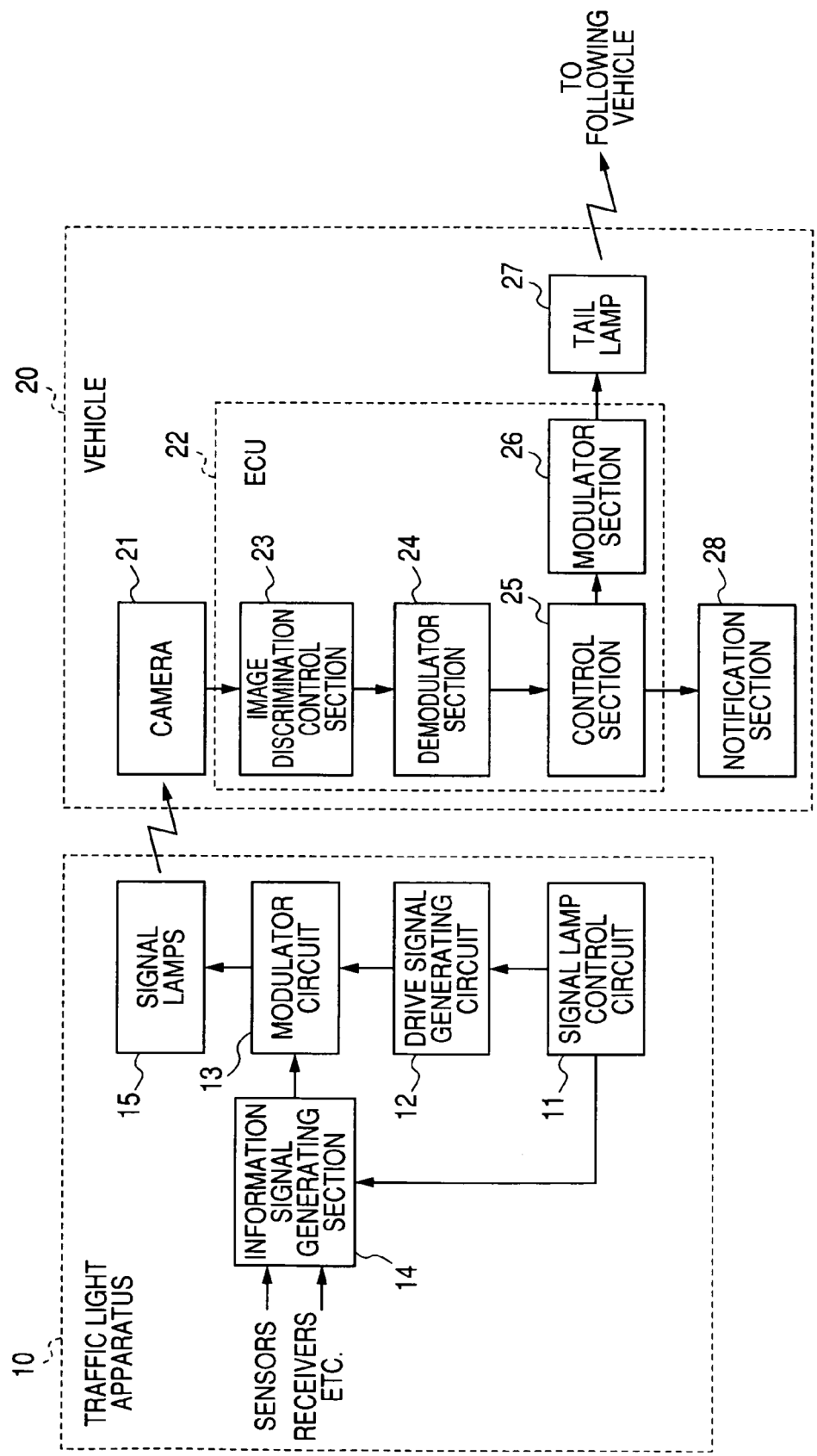
FIG. 1 is a block diagram showing the general configuration of an embodiment of a vehicle-use communication apparatus and of a traffic light apparatus which communicates with the vehicle-use communication apparatus.

FIG. 1 is a system block diagram showing the general configuration of an embodiment of a vehicle-use communication apparatus installed in a vehicle 20. The embodiment is configured for operation within a traffic system having a number of traffic light apparatuses, each functioning in a similar manner to the traffic light apparatus 10 shown in FIG. 1.

The configuration of the traffic light apparatus 10 will first be described. As shown, the traffic light apparatus 10 is made up of a signal lamp control circuit 11, a drive signal generating circuit 12, a modulator circuit 13, an information signal generating section 14 and a set of signal lamps 15. The signal lamp control circuit 11 generates a designation signal at predetermined intervals, for designating that light is to be emitted by a specific one of the signal lamps 15 (i.e., with the specified signal lamp being changed when traffic light changeover is to be performed). The designation signal is supplied to the drive signal generating circuit 12, which thereby generates a drive signal for producing emission of light by the specified one of the signal lamps 15. The drive signal is inputted to the modulator circuit 13 together with an information signal, when that signal is being generated by the information signal generating section 14 (i.e., periodically, or when required).

The information signal conveys specific information, which may be of various types as described hereinafter. While the information signal is being supplied from the information signal generating section 14, the modulator circuit. 13 generates a carrier signal of appropriate frequency and modulates this with the information signal to generate a modulated carrier signal. The modulated carrier signal is superimposed on the drive signal from the drive signal generating circuit 12, and the resultant modulated drive signal is applied to drive the currently selected one of the signal lamps 15.

The currently selected signal lamp is thereby driven to emit modulated light, conveying the information signal.

The modulator circuit 13 may utilize any of various modulation methods for modulating the carrier signal by the information signal, such as ASK (amplitude shift keying), FSK (frequency shift keying), PSK (phase shift keying), etc.

The information signal generating section 14 acquires information relating to traffic conditions, traffic restrictions, etc., in the vicinity of the traffic light apparatus 10, based on signals that are transmitted to the information signal generating section 14 from a supervisory center (not shown in the drawings) which supervises traffic information, or based on signals from a detection apparatus (not shown in the drawings) that detects the level of traffic flow in the vicinity of the traffic light apparatus 10. In addition, information concerning right-turn lane or left-turn lane regulations, right-turn prohibition, other street information and traffic regulations, etc., are stored beforehand in a memory (not shown in the drawings) of the information signal generating section 14. The information signal generating section 14 also receives, from the signal lamp control circuit 11, information specifying which of the signal lamps 15 is/are currently emitting light, and the amount of time that will elapse until that condition will change.

The specific information to be conveyed by the information signal is determined by the information signal generating section 14 based on these various types of supplied information.

The signal lamps 15 of this embodiment respectively emit red, yellow and green light. They are preferably made up of LEDs (light-emitting diodes), which have a long operating life and good response characteristics.

The configuration of the vehicle-use communication apparatus installed in the vehicle 20 will be described more specifically in the following. As shown in FIG. 1, the apparatus includes a camera apparatus 21, and an ECU (electronic control unit) 22 which is made up of a image discrimination control section 23, a demodulator section 24, a control section control section 25, and a modulator section 26, etc. The vehicle-use communication apparatus further includes a tail lamp 27 which is driven to emit modulated light as described hereinafter, and a notification section 28 which notifies the vehicle driver of received information.

The camera apparatus 21 is installed on the vehicle 20 at a location whereby the signal lamps 15 of the traffic light apparatus 10 and the tail lamp of a preceding vehicle can each be within the field of view of the camera apparatus 21. For example the camera apparatus 21 may be installed beside the rear-view mirror of the vehicle. The camera apparatus 21 captures images of a region ahead of the vehicle at fixed periodic intervals, and supplies resultant image data to the ECU 22.

When a signal is superimposed on the light received by the camera apparatus 21 (i.e., the received light intensity is modulated in accordance with a modulated carrier signal as described above), the ECU 22 performs demodulation processing to recover the aforementioned information signal, based on the image data received from the camera apparatus 21.

The ECU 22 then processes the received information signal to obtain all or part of the information conveyed by the information signal, to be used as notification information (i.e., information that is to be notified to the vehicle driver is extracted). The ECU 22 also processes the received information signal to obtain information that is to be transmitted to a preceding vehicle. That information may be identical to the notification information, or may be modified in a predetermined manner.

In FIG. 1, the respective functions that are executed by the ECU 22 are shown conceptually as function blocks, however in practice each of these function blocks is implemented by software, i.e., by a computer operating under a predetermined program. The function blocks are described in the following. Firstly, based on the image data captured by the camera apparatus 21, the image discrimination control section 23 determines whether each captured image contains (an image of) a light source that is either a signal lamp of a traffic light apparatus or tail lamp of a preceding vehicle, or contains both a signal lamp and a tail lamp. With this embodiment, this determination is made based on applying template matching to the image data supplied from the camera apparatus 21, to recognize the image of one of the signal lamps 15 or the image of a tail lamp of a preceding vehicle.

If it is judged that the received image data contains an image of a signal lamp of a traffic light apparatus, or of a tail lamp of a preceding vehicle, the image discrimination control section 23 extracts from each captured image the corresponding part or parts of the image data (i.e., the part(s), within each captured image, representing a signal lamp or a tail lamp). An image signal value of each such extracted portion is then stored in memory.

This processing is repeated for successive captured images, so long as the signal lamp or tail lamp remains within the field of view of the camera apparatus 21, emitting modulated light.

The image signal values thus stored are read out, and demodulation processing is applied to them to recover the original information signal, as follows.

The succession of read-out image signal values, expressing a received-light signal, are inputted to the demodulator section 24. Since the received-light signal is modulated in accordance with the aforementioned modulation applied by the modulator circuit 13 of the traffic light apparatus 10, the demodulator section 24 applies time-sequential demodulation processing to the values constituting the received-light signal, to thereby recover the originally transmitted information signal. The resultant demodulated information signal is supplied to the control section control section 25, which extracts the aforementioned specific information, and supplies all or a selected part of that information to the notification section 28, as notification information for the vehicle driver. If only a part of the transmitted specific information is selected as notification information, this is done by using predetermined conversion criteria.

The notification section 28 is equipped to provide visual and/or audible notification to the vehicle driver of the notification information obtained by the control section control section 25.

In addition, the control section control section 25 supplies the received specific information (directly, or after applying predetermined conversion processing) to the modulator section 26, in the form of an information signal that is to be transmitted. The modulator section 26 generates a drive signal that is modulated in accordance with that information signal, and the drive signal is applied to modulate the light emitted by the tail lamp 27, in a similar manner to that described above for the signal lamps 15.

When a following vehicle (equipped with a similar vehicle-use communication apparatus to that of the vehicle 20) receives the modulated light from the tail lamp 27, it can obtain the information conveyed by the transmitted information signal, by the processing operations described above. In that way, information transmitted from the traffic light apparatus 10 can be relayed to successive vehicles.

It is possible that a vehicle (referred to in the following as vehicle 1) may receive modulated light from a traffic light apparatus while also receiving modulated light from the tail lamp of a preceding vehicle (referred to in the following as vehicle 2) which has completed moving past that traffic light apparatus. In that case, the information transmitted from vehicle 2 may not be valid for vehicle 1. Hence, problems can arise if vehicle 1 notifies its driver of the information received from vehicle 2, and transmits that information to a following vehicle. Such problems may arise with a prior art type of traffic control system.

However with this embodiment, the ECU 22 is configured to be capable of discriminating between the case in which a light source is a signal lamp of a traffic light apparatus 10 and the case in which a light source is a tail lamp of a preceding vehicle. When light from a signal lamp of a traffic light apparatus 10 and light from a tail lamp of a preceding vehicle are being received concurrently in each of successive captured images obtained by the camera apparatus 21, the vehicle-use communication apparatus will select only the information transmitted by the signal lamp of the traffic light apparatus 10. Thus it can be ensured that the information reported by the notification section 28 to the vehicle driver and the information transmitted from the tail lamp 27 will be based on the information signal transmitted from the signal lamp of the traffic light apparatus 10.

It can thereby be ensured that the information reported to the driver of that vehicle 20 and also any information which is transmitted from that vehicle 20 to a following vehicle will be appropriate, since each vehicle-use communication apparatus always gives priority to information that is received from a signal lamp of a traffic light apparatus.

Figure 2:
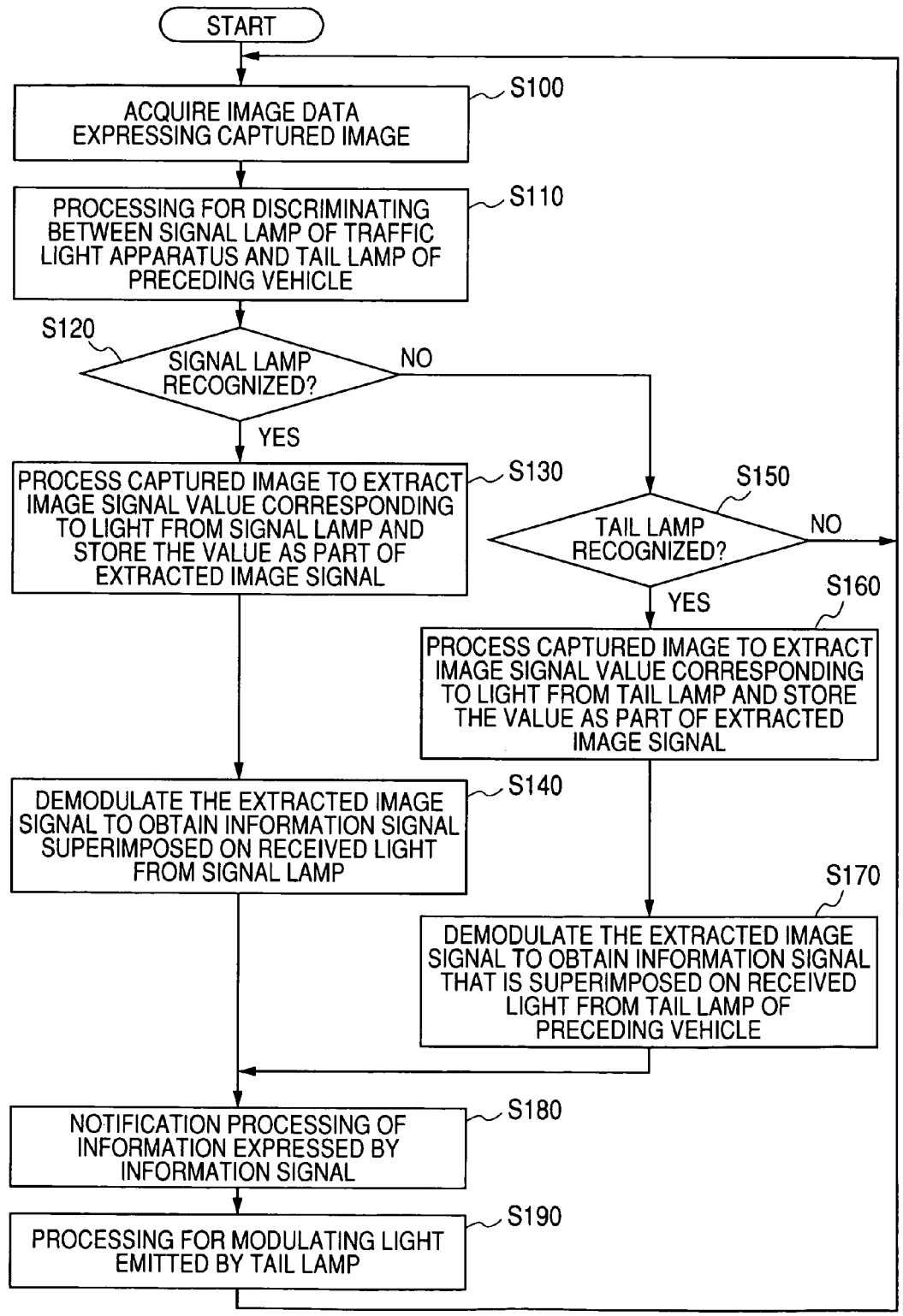
FIG. 2 is a flow diagram of communication control processing that is executed by the embodiment.

This will be described referring to the flow diagram of FIG. 2, showing a processing routine that is repetitively executed by the ECU 22 in a vehicle-use communication apparatus of a vehicle 20. Firstly, (step S100) image data expressing a captured image are acquired by the camera apparatus 21, then (step S110) discrimination processing (i.e., using template matching) is applied to the image data to determine whether the captured image contains a light source whose characteristics correspond either to a signal lamp of a traffic light apparatus 10 or to a tail lamp of a vehicle.

Next in step S120, based on the processing results obtained from step S110, a decision is made as to whether or not the captured image contains (an image of) a light source that is a signal lamp of a traffic light apparatus. If it is judged that the image does not contain such a light source, then step S150 is executed, to judge whether the captured image contains a light source that is a tail lamp of a vehicle.

Thus, in the processing of FIG. 2, a decision is first made (in step S120) as to whether a signal lamp of a traffic light apparatus 10 has been recognized in the image captured by the camera apparatus 21. Only if such a signal lamp has not been recognized will a decision be made as to whether a tail lamp of a preceding vehicle is recognized in the captured image.

As a result, when a signal lamp of a traffic light apparatus 10 and also a tail lamp of a preceding vehicle are both recognized within the captured image, since the recognition results obtained for the signal lamp of a traffic light apparatus 10 are given priority in the processing sequence, the subsequent processing is carried out only on data conveyed by modulated light from the signal lamp of the traffic light apparatus 10.

If a signal lamp of a traffic light apparatus 10 is recognized (YES decision in step S120) then step S130 is executed, in which a value of an image signal component (e.g., luminance value) that corresponds to the level of received light from the signal lamp is extracted from the portion of the captured image that expresses the signal lamp. Such an extracted value will be referred to as a received-light signal value. Each received-light signal value is converted to digital data form, and stored in memory.

Step S140 is then executed, in which the received-light signal values that have been stored up to the current point in time (i.e., since the signal lamp was first recognized in a captured image) are read out and arranged as a time-axis series. Demodulation processing is then applied as described above, for extracting the information signal transmitted from the signal lamp of the traffic light apparatus 10.

If a signal lamp of a traffic light apparatus 10 has not been recognized in the captured image (NO decision in step S120), and a tail lamp of a preceding vehicle is recognized (YES decision in S150), then steps S160, S170 are executed. In steps S160, S165, S170, similar processing is executed to that described above for steps S130, S135, S140. However in this case, an information signal conveyed by modulated light from the tail lamp of a preceding vehicle is extracted in step S170.

Following step S140 or step S170, step S180 is executed, in which as described above, the information expressed by the extracted information signal is acquired and is outputted to the notification section 28 (directly, or after predetermined modification) as information that is to be notified to the vehicle driver. Step S190 is then executed, in which a drive signal is generated that is modulated with the extracted information signal (or a signal that is based on the extracted information signal) and is applied to modulate the light emitted by the tail lamp 27, in a similar manner to that described for modulation of light from a signal lamp.

The information conveyed by the extracted information signal is thereby transmitted to a following vehicle.

Thus with this embodiment, when modulated light is concurrently being received by the vehicle-use communication apparatus of a vehicle from a signal lamp of a traffic light apparatus and also from a tail lamp of a preceding vehicle, priority is given to processing for obtaining an information signal conveyed by the light from the signal lamp. As a result, information can be reliably obtained by the vehicle-use communication apparatus of a vehicle from a traffic light apparatus 10 that is located ahead of the vehicle, and that information can be transmitted to a following vehicle.

It can thereby be ensured that each vehicle will receive appropriate information.

Alternative Embodiments

Figure 3:
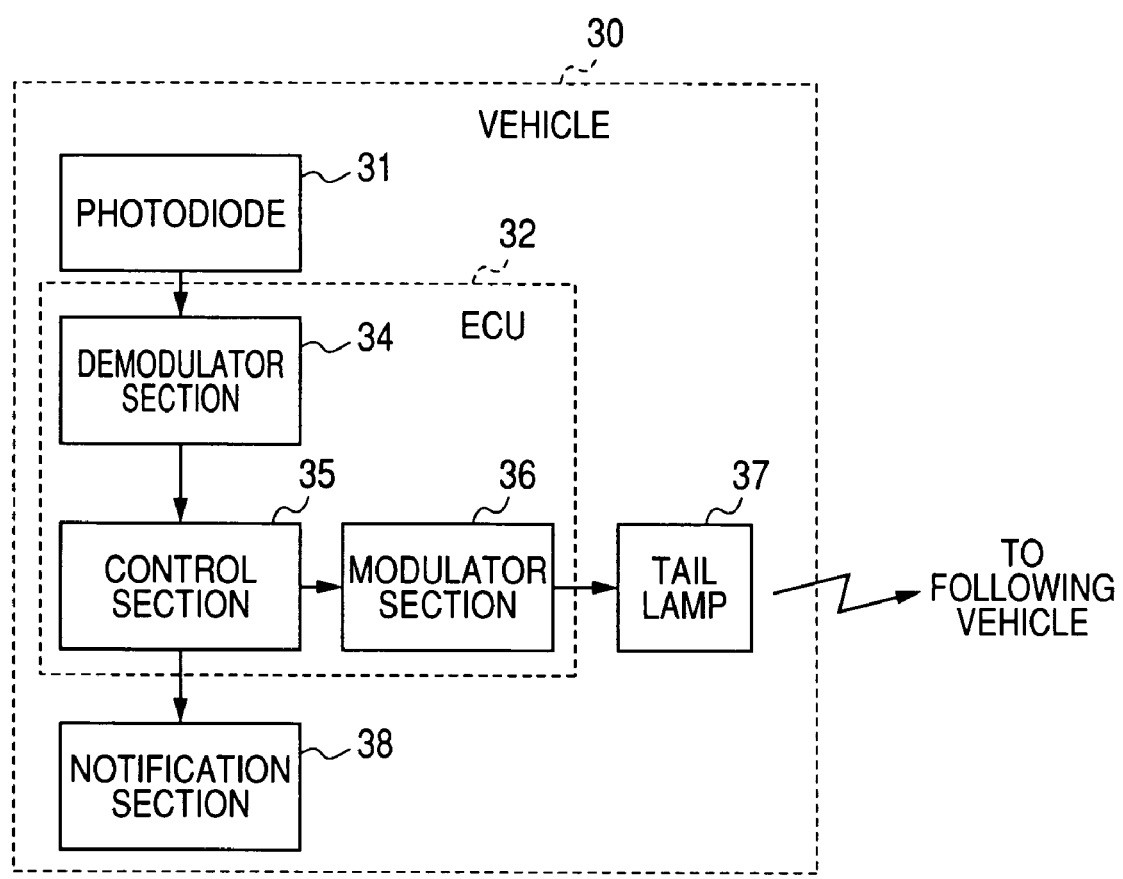
FIG. 3 is a block diagram showing the general configuration of an alternative embodiment.

Although a preferred embodiment has been described in the above, the invention is not limited to this, and alternative embodiments may be envisaged, which fall within the scope claimed for the invention as set out in the appended claims. For example, with the first embodiment above, a camera apparatus 21 is used to receive light that is emitted from a signal lamp of a traffic light apparatus 10 or from a tail lamp of a preceding vehicle. However it is also possible to utilize a sensor such as a photodiode (for obtaining an electrical signal varying in accordance with the level of incident light) in place of a camera. FIG. 3 illustrates an embodiment of a vehicle-use communication apparatus which utilizes a photodiode 31 for that purpose.

When a photodiode is utilized, it is not possible to use captured image data for distinguishing between a light source that is a signal lamp of a traffic light apparatus 10 and a light source that is a tail lamp of a preceding vehicle, as is done with the first embodiment. With the embodiment of FIG. 3, an opto-electric signal produced from the photodiode 31 is directly supplied to the demodulator section 34 of a ECU 32, without being supplied to an image recognition processing section as for the first embodiment.

With the embodiment of FIG. 3, it is necessary to distinguish between modulated light emitted from a signal lamp of a traffic light apparatus 10 and the modulated light that is emitted from a tail lamp of a preceding vehicle, in order to be able to assign priority to information that is conveyed by the light from a signal lamp of a traffic light apparatus 10. To achieve this, the light which is emitted from each light source (signal lamp or tail lamp) is modulated with a transmission source code, which indicates the type of source from which the light is emitted.

Specifically, with this embodiment the information signal generating section 14 of the traffic light apparatus 10 shown in FIG. 1 generates a signal expressing a transmission source code, for indicating that the transmission source (light emission source) is a signal lamp of a traffic light apparatus 10, with the transmission source code signal being supplied to the modulator circuit 13. The modulator circuit 13 thereby modulates the light emitted by the (currently selected) one of the signal lamps 15, in accordance with the transmission source code (in addition to the specific information described for the first embodiment).

The control section 35 of the ECU 32 in the vehicle 30 similarly generates a signal expressing a transmission source code, which in this case serves to indicate that the transmission source is a tail lamp of a vehicle.

The transmission source code signal is supplied to the modulator section 36, which thereby modulates the light emitted by the tail lamp 37 to convey the transmission source code (in addition to the information modulation described for the modulator section 26 and tail lamp 27 of the first embodiment).

In that way, when the photodiode 31 receives modulated light, it can recognize the type of transmission source based on the transmission source code conveyed by the received light.

Figure 4:
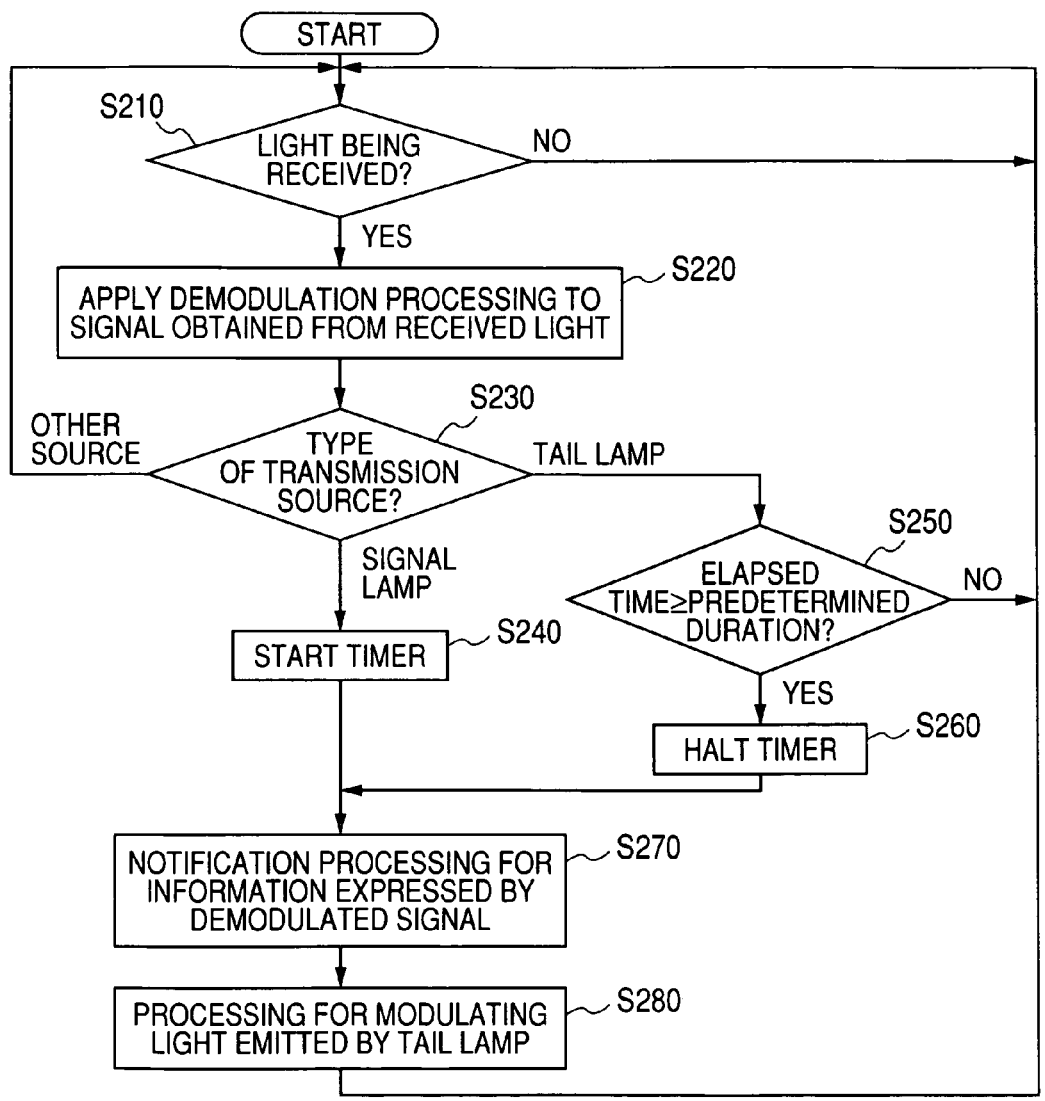
FIG. 4 is a flow diagram of communication control processing that is executed by the alternative embodiment.

FIG. 4 is a flow diagram of a processing routine that is repetitively executed by the ECU 32 of a vehicle-use communication apparatus installed in a vehicle 30, with this embodiment. Firstly, in step S210, a decision is made as to whether a modulated opto-electric signal is being produced from the photodiode 31. If there is a YES decision then step S220 is executed, in which demodulation processing is applied to the opto-electric signal.

Next in step S230 a decision is made as to whether the opto-electric signal results from transmission source that is a signal lamp of a traffic light apparatus 10 or that is a tail lamp of a preceding vehicle. This judgement is made based upon analyzing the transmission source code contained in the demodulated signal. If the transmission source code is unclear, then operation returns to step S210.

However if it is judged in step S230 that the transmission source is a signal lamp of a traffic light apparatus 10, then step S240 is executed. In step S240, counting by a timer is started. Steps S270 and S280 are then successively executed, in which the information conveyed by the extracted signal (i.e., a signal obtained by the demodulation processing of step S220) is notified to the vehicle driver, and processing is performed for modulating the light emitted from the tail lamp 37, to convey the information conveyed by the extracted signal together with a transmission source code indicating that the information is transmitted from a tail lamp. The information is thereby transmitted to a following vehicle, as described for the first embodiment, together with the appropriate transmission source code.

If it is judged in step S230 that the transmission source is a tail lamp, then step S250 is executed in which the count value reached by the timer is compared with a predetermined value. The time required for the timer to reach the predetermined value (after being started) corresponds to the estimated amount of time required for the vehicle 30 to move past a traffic light apparatus 10. If that amount of time has not yet elapsed (i.e., since a preceding execution of step S240), then operation returns to step S210. If that time amount has elapsed, then in step S260, counting by the timer is halted and it is reset.

In that way, once the photodiode 31 receives light that is emitted from a signal lamp of a traffic light apparatus 10, a waiting interval is initiated (i.e., the timer is started in step S240). In that condition, even if modulated light from a tail lamp of a preceding vehicle is received by the photodiode 31, no processing is performed on the signal conveyed by that received modulated light until the waiting interval has elapsed (i.e., a YES decision is reached in step S260).

Hence when the vehicle 30 moves close to a traffic light apparatus 10, and enters a condition in which it receives modulated light emitted by one of the signal lamps 15 of the traffic light apparatus 10, priority is given to processing the signal that is superimposed on the light received from the traffic light apparatus 10. That is to say, until the predetermined waiting interval has elapsed, modulated light received from any other source is ignored.

If a YES decision is reached in step S250 and step S260 then executed as described above, the processing of steps S270 and S280 is applied to a signal extracted from modulated light that is received by the photodiode 31 after the waiting interval has elapsed, i.e., modulated light that is received after the vehicle 30 has completed moving past a traffic light apparatus 10 (in general, light emitted from a tail lamp of a preceding vehicle).

It should be noted that it would be possible to modify this embodiment, for example to set a limit to the range of distances within which information can be received from a traffic light apparatus 10.

For example, if the vehicle 30 is moving towards a traffic light apparatus 10, but the distance to the traffic light apparatus 10 is extremely long, then it is possible that the information which would thereby be received from that specific traffic light apparatus 10 would not be appropriate for that vehicle.

This problem is avoided, with the present invention, by defining a maximum distance for which appropriate information can be received by a vehicle from a traffic light apparatus 10 (i.e., a permissible maximum value of distance between the vehicle and the traffic light apparatus 10). This can readily be achieved by using a system in which each traffic light apparatus 10 transmits information that includes data specifying the location of that traffic light apparatus 10 or the time point at which the signal conveying the information is transmitted from the traffic light apparatus 10. With such a system, each vehicle can be equipped to use current time information and location information for the vehicle, in conjunction with the information received from a traffic light apparatus 10, to determine whether the vehicle can receive valid information from that traffic light apparatus 10. Each vehicle can for example have a vehicle navigation apparatus such as a GPS (global positioning satellite) navigation apparatus installed, for providing current location information or precise current local time information for the vehicle.

FIG. 5 is a flow diagram of an example of control processing that could be executed by a vehicle-use communication apparatus in the case of such a modified embodiment, when it is detected that a transmission (modulated light) is being received from a signal lamp of a traffic light apparatus 10. Firstly in step S310, information specifying the current location of the vehicle is obtained from a vehicle navigation apparatus. In the following step S315, the location of the traffic light apparatus that is transmitting the modulated light is extracted from the information conveyed by the light. Next in step S320 a decision is made as to whether the distance from the vehicle to the that traffic light apparatus is greater than a predetermined value. If there is a NO decision in step S320 then this indicates that the information conveyed by the received signal from the traffic light apparatus is valid for this vehicle, and for following vehicles. In that case, step S330 is executed, in which the information conveyed by the received signal is transmitted by the tail lamp of the vehicle concerned, as described hereinabove for the preceding embodiments.

However if there is a YES decision in step S320 then this indicates a high probability that the information conveyed by the received signal from the traffic light apparatus 10 is not valid for this vehicle, or for following vehicles. Hence in that case, step S330 is skipped. Preferably in such a case, notifying of the received information to the vehicle driver is also skipped.

It can thereby be ensured that information that is transmitted from a traffic light apparatus 10 will only be propagated within an appropriate range of distance from the traffic light apparatus 10, i.e., a range within which the information is valid.

Alternatively, as illustrated in the flow diagram of FIG. 6, the local current time for the vehicle can be precisely obtained (S410), for example by utilizing a GPS apparatus. The time at which a received signal was transmitted from a a traffic light apparatus is then obtained (step S415), with that time information being conveyed by the received signal. A decision is then made (S320) as to whether the difference between the time of transmission of the signal received from the traffic light apparatus and the current time point is greater than a predetermined value. The results of this decision determine whether step S430 (corresponding to step S330 of FIG. 5) is executed, in a similar manner to that described above for the processing of FIG. 5.

It should be understood that further modifications to the above embodiments or alternative embodiments could be envisaged, which fall within the scope claimed for the invention as set out in the appended claims. In particular, it will be apparent that the elapsed time (waiting time) function described relating to FIG. 4, and the maximum distance (or transmission/reception time difference) limiting function described relating to FIGS. 5 and 6, can be readily be incorporated into the first embodiment.

What is claimed is:

1. A vehicle-use communication apparatus, installed on a vehicle for operating within a traffic communication system wherein a signal lamp of a traffic light apparatus transmits, to vehicles, light which is modulated with a signal conveying information, and wherein said vehicle-use communication apparatus transmits said information to a following vehicle;
said vehicle-use communication apparatus comprising
a photo-receptive device for receiving said light emitted from said signal lamp and light which is emitted from a tail lamp of a preceding vehicle,
demodulator circuitry for demodulating a signal which is conveyed by modulated light that is received by said photo-receptive device,
notification means for notifying, to a driver of said vehicle on which said communication apparatus is installed, received information that is expressed by said signal obtained by demodulating said modulated light, and
light emission control circuitry configured to modulate light emitted from a tail lamp of said vehicle on which said communication apparatus is installed, in accordance with said received information, for thereby transmitting said received information to a following vehicle;
wherein said vehicle-use communication apparatus comprises;
discrimination circuitry configured to distinguish between reception of modulated light emitted from said signal lamp and reception of modulated light emitted from said tail lamp of a preceding vehicle; and,
control circuitry configured to control said notification means and said light emission control circuitry in accordance with results obtained by said discrimination circuitry, said control being applied whereby when modulated light is received by said photoreceptive device both from said signal lamp of a traffic light apparatus and from said tail lamp of a preceding vehicle, only information conveyed by said modulated light from said signal lamp is notified to said vehicle driver and transmitted to said following vehicle.

2. A communication apparatus according to claim 1, wherein:
said photo-receptive device comprises a camera apparatus for deriving image data expressing a captured image of an exterior region that is within a field of view of said camera apparatus, said camera apparatus having a field of view which contains said signal lamp of said traffic light apparatus and said tail lamp of a preceding vehicle; and
said discrimination circuitry is configured to analyze image data from said camera apparatus, to judge whether a transmission source of received light that is expressed by said image data comprises said signal lamp of a traffic light apparatus or said tail lamp of a preceding vehicle.

3. A communication apparatus according to claim 1, wherein:
said signal which modulates light emitted by said signal lamp of a traffic light apparatus further conveys a transmission source code indicative that said signal is transmitted from a traffic light apparatus and said signal which modulates light emitted by said tail lamp of a preceding vehicle further conveys a transmission source code indicative that said signal is transmitted from a vehicle tail lamp; and
said discrimination circuitry is configured to judge whether said received modulated light is emitted from a signal lamp of a traffic light apparatus or from a tail lamp of a preceding vehicle, with said judgment being based on said transmission source code conveyed by said received modulated light.

4. A communication apparatus according to claim 1, wherein said signal which modulates light emitted by said signal lamp of a traffic light apparatus conveys information indicative of a signaling condition of said traffic light apparatus.

5. A communication apparatus according to claim 1, wherein said signal which modulates light emitted by said signal lamp of a traffic light apparatus conveys position information indicative of a location of said traffic light apparatus, and said communication apparatus comprises:
a position detection apparatus configured to detect a current position of said vehicle in which said communication apparatus is installed; and
circuitry configured to calculate a distance between said traffic light apparatus and said vehicle, based on said position information from said traffic light apparatus and said current position detected by said position detection apparatus, and to detect a condition whereby said distance exceeds a predetermined value;
wherein said light emission control circuitry is configured to respond to detection of said condition by inhibiting said transmission of received information by modulation of light from said tail lamp of said vehicle.

6. A vehicle-use communication apparatus according to claim 1, wherein said signal which modulates light emitted by said signal lamp of a traffic light apparatus conveys timing information indicative of a time point of transmission of said signal, and said vehicle-use communication apparatus comprises;
circuitry configured to calculate a time duration that has elapsed from between said time point of transmission of said signal by said traffic light apparatus and a current time, and to detect a condition whereby said time duration exceeds a predetermined value;
wherein said light emission control circuitry is configured to respond to said detection of said condition by inhibiting said transmission of received information by modulation of light from said tail lamp of said vehicle in which said communication apparatus is installed.

* * * * *